United States Patent
Renouf

(10) Patent No.: US 7,191,434 B2
(45) Date of Patent: Mar. 13, 2007

(54) LOADING OBJECT-ORIENTED COMPUTER PROGRAMS

(75) Inventor: Timothy Renouf, Newbury (GB)

(73) Assignee: Tao Group Limited, Reading (GB)

( * ) Notice: Subject to any disclaimer, the term of this patent is extended or adjusted under 35 U.S.C. 154(b) by 0 days.

(21) Appl. No.: 10/094,241

(22) Filed: Mar. 8, 2002

(65) Prior Publication Data

US 2004/0015914 A1 Jan. 22, 2004

Related U.S. Application Data

(63) Continuation of application No. PCT/GB99/04415, filed on Dec. 23, 1999.

(30) Foreign Application Priority Data

Sep. 14, 1999 (GB) ................................. 9921720.0

(51) Int. Cl.
*G06F 9/45* (2006.01)
(52) U.S. Cl. ........................ 717/148; 717/137; 718/102
(58) Field of Classification Search ................ 717/116, 717/166, 148, 137, 138; 718/102
See application file for complete search history.

(56) References Cited

U.S. PATENT DOCUMENTS

| | | | |
|---|---|---|---|
| 5,005,152 A | 4/1991 | Knutsen | |
| 5,155,847 A | 10/1992 | Kirouac et al. | 709/221 |
| 5,295,263 A | 3/1994 | Kojima et al. | |
| 5,367,685 A * | 11/1994 | Gosling | 717/148 |
| 5,414,855 A * | 5/1995 | West | 717/158 |
| 5,421,017 A | 5/1995 | Scholz et al. | |
| 5,513,355 A | 4/1996 | Doellinger et al. | |
| 5,560,013 A * | 9/1996 | Scalzi et al. | 717/138 |
| 5,615,400 A | 3/1997 | Cowsar et al. | |
| 5,634,058 A | 5/1997 | Allen et al. | |
| 5,636,276 A | 6/1997 | Brugger | |
| 5,684,996 A | 11/1997 | Westerholm et al. | |
| 5,764,989 A | 6/1998 | Gustafsson et al. | |
| 5,794,049 A | 8/1998 | Lindholm | |

(Continued)

FOREIGN PATENT DOCUMENTS

EP 0 406 028 A2 1/1991

(Continued)

OTHER PUBLICATIONS

"JAVA!", Tim Richey, New Riders Publishing Tomorrow's Realities, pp. 1-78, 283-366, Published Sep. 23, 1995.*

(Continued)

*Primary Examiner*—Todd Ingberg
(74) *Attorney, Agent, or Firm*—Morgan & Finnegan, LLP

(57) ABSTRACT

A method of loading an object-oriented computer program comprises translating the program into compiled code and holding that code, ready for execution, in an execution environment which does not necessarily also hold the original program code. In a preferred embodiment, the original class file is discarded from memory prior to execution of the program. The invention is particularly applicable to wireless communications networks consisting of a plurality of client devices, such as mobile phones, each of which typically has only a small amount of memory available. Using the present invention, the original class file is discarded after compilation, and does not need to be retained in the client device memories.

16 Claims, 4 Drawing Sheets

U.S. PATENT DOCUMENTS

| | | | |
|---|---|---|---|
| 5,815,708 A | 9/1998 | Kessler et al. | |
| 5,815,718 A | 9/1998 | Tock | |
| 5,832,269 A | 11/1998 | Döllinger et al. | |
| 5,838,978 A * | 11/1998 | Buzbee | 717/158 |
| 5,920,720 A * | 7/1999 | Toutonghi et al. | 717/148 |
| 5,937,621 A | 8/1999 | Petrov et al. | 715/626 |
| 5,950,008 A | 9/1999 | van Hoff | 717/139 |
| 5,978,585 A * | 11/1999 | Crelier | 717/145 |
| 6,078,744 A * | 6/2000 | Wolczko et al. | 717/153 |
| 6,081,665 A * | 6/2000 | Nilsen et al. | 717/116 |
| 6,092,120 A * | 7/2000 | Swaminathan et al. | 709/247 |
| 6,093,216 A * | 7/2000 | Adl-Tabatabai et al. | 717/128 |
| 6,110,226 A * | 8/2000 | Bothner | 717/153 |
| 6,115,719 A * | 9/2000 | Purdy et al. | 707/103 R |
| 6,139,199 A * | 10/2000 | Rodriguez | 717/159 |
| 6,141,794 A * | 10/2000 | Dice et al. | 717/118 |
| 6,151,618 A * | 11/2000 | Wahbe et al. | 718/1 |
| 6,151,703 A * | 11/2000 | Crelier | 717/136 |
| 6,158,048 A * | 12/2000 | Lueh et al. | 717/118 |
| 6,219,045 B1 | 4/2001 | Leahy et al. | 715/757 |
| 6,295,642 B1 * | 9/2001 | Blandy | 717/148 |
| 6,298,477 B1 * | 10/2001 | Kessler | 717/145 |
| 6,330,709 B1 * | 12/2001 | Johnson et al. | 717/100 |
| 6,338,160 B1 * | 1/2002 | Patel et al. | 717/139 |
| 6,339,841 B1 | 1/2002 | Merrick et al. | 717/166 |
| 6,412,107 B1 * | 6/2002 | Cyran et al. | 717/148 |
| 6,438,745 B1 * | 8/2002 | Kanamaru et al. | 717/137 |
| 6,442,753 B1 * | 8/2002 | Gerard et al. | 717/170 |
| 6,496,575 B1 * | 12/2002 | Vasell et al. | 379/102.05 |
| 6,523,171 B1 * | 2/2003 | Dupuy et al. | 717/136 |
| 6,530,075 B1 * | 3/2003 | Beadle et al. | 717/114 |
| 6,584,612 B1 * | 6/2003 | Mueller et al. | 717/166 |
| 6,606,743 B1 * | 8/2003 | Raz et al. | 717/148 |
| 6,631,521 B1 * | 10/2003 | Curtis | 717/175 |
| 6,637,025 B1 * | 10/2003 | Beadle et al. | 717/148 |
| 6,691,306 B1 * | 2/2004 | Cohen et al. | 717/139 |
| 6,704,926 B1 * | 3/2004 | Blandy et al. | 717/148 |
| 6,745,386 B1 * | 6/2004 | Yellin | 717/166 |
| 6,748,588 B1 * | 6/2004 | Fraser et al. | 717/146 |
| 6,820,252 B2 * | 11/2004 | Sakamoto et al. | 717/136 |
| 6,823,509 B2 * | 11/2004 | Webb | 718/1 |
| 6,851,111 B2 * | 2/2005 | McGuire et al. | 717/166 |
| 6,915,511 B2 * | 7/2005 | Susarla et al. | 717/166 |
| 6,973,646 B1 * | 12/2005 | Bordawekar et al. | 717/146 |
| 6,996,829 B2 * | 2/2006 | Meyer | 719/328 |
| 7,017,824 B1 | 3/2006 | Thiriet | |
| 7,031,990 B2 * | 4/2006 | Garthwaite | 707/206 |
| 7,051,323 B2 * | 5/2006 | Lam et al. | 717/148 |
| 7,058,929 B2 * | 6/2006 | Charnell et al. | 717/135 |
| 7,076,765 B1 * | 7/2006 | Omori | 717/121 |

FOREIGN PATENT DOCUMENTS

| | | |
|---|---|---|
| EP | 0 546 794 A2 | 6/1993 |
| EP | DE 196 20 888 A1 | 11/1997 |
| EP | DE 196 37 883 B4 | 11/1997 |
| EP | 0 811 911 A2 | 12/1997 |
| EP | 0810522 A2 | 12/1997 |
| EP | 0913769 A2 | 5/1999 |
| EP | 0 924 611 A2 | 6/1999 |
| EP | 0930567 A2 | 7/1999 |
| EP | 0913769 A3 | 12/1999 |
| WO | WO 97/42728 | 11/1997 |
| WO | WO 97/43711 | 11/1997 |
| WO | WO 98/19237 | 5/1998 |
| WO | WO 98/37486 | 8/1998 |
| WO | WO 98/53398 | 11/1998 |

OTHER PUBLICATIONS

The JAVA Archive (JAR) File Format: Table of Contents, p. 1 of 1, printed May 26, 2003.*

"JAR Guide", Sun Microsystems, 2 pages printed May 26, 2003.*

"JAVA Archive (JAR) Features", Sun Microsystems Inc. 2 pages, printed May 26, 2003.*

"Compiling the Example Programs", Sun Microsystems, 5 pages, printed Jun. 13, 2001.*

"Creating a JAR File", Sun Microsystems Inc, 3 pages printed May 26, 2003.*

"Lesson:Using JAR files: The Basics", Sun Microsystems, 3 pages printed May 26, 2003.*

"Running JAR-Packaged Software", Sun Microsystems, 3 pages, printed May 26, 2003.*

"Viewing the Contents of a JAR File", Sun Microsystems, 2 pages printed May 26, 2003.*

"Extracting the Contents of a JAR File", Sun Microsystems, 2 pages printed May 26, 2003.*

"Updating a JAR File", Sun Microsystems, 3 pages printed May 26, 2003.*

"Understanding the Manifest", Sun Microsystems, 4 pages printed May 26, 2003.*

"Modifying a Manifest File", Sun Microsystem, 3 pages printed May 26, 2003.*

The JAVA Archive (JAR) file Format Sun Microsystems 2 pages printed May 26, 2003.*

"The JarRunner Class", Sun Microsystems, 2 pages printed May 26, 2003.*

"The JarClassLoader Class", Sun Microsystems, 2 pages printed May 26, 2003.*

"Trail: JAR Files", Alan Sommerer, 2 pages printed May 26, 2003.*

"JAR File Specification", Sun Microsystems, 13 pages printed May 26, 2003.*

"The JAVA HotSpot Performance Engine Architecture", Sun Microsystems, published Apr. 1999.*

"Dynamic Compilation", Weimer of Berkeley, published Jan. 1996.*

"Efficiewnt Implementation of the Smalltalk-80 System", L.Peter Deutsch et al, ACM 1984.*

"JAVA Technology An Early Histroy", Sun Microsystems, 10 pages printed Feb. 2000.*

"JAVA: The First 800 Days", Sun Microsystems, 70 pages, printed Feb. 2000.*

"Dynamic Class Loading in the JAVA Virtual Machine", Sheng Liang, et al, ACM, 1998, pp. 36-44.*

"Load-Time Adaption: EEfficient and Non Intrusive Language Extension for Virtual Machine", Andrew Duncan et al, 1999, 18 pages.*

"Computer Architecture A Quantitative Approach" Second Edition, David A. Patterson et al, 1966, pp. 341-343.*

The JAVA Virtual Machine Specification, Second Edition, Tim Lindholm and Frank Yellin, published Apr. 22, 1999, Chapters 1-8, printed from Sun Web site.*

UK Patent Application No. 9820594.1, GB 2341951 A, Filing Date: Sep. 22, 1998, Publication Date: Mar. 29, 2000.

UK Patent Application No. 9819841.9, GB 2341462 A, Filing Date: Sep. 12, 1998, Publication Date: Mar. 15, 2000.

"Improving Java's Instance of Operator: Downloading Classes On Demand", IBM Corp, UK, 1998, vol. 41.

Steinhorn, Jason. "Compiling Java: Java Compilers for Embedded Systems" Embedded Systems Programming, Sep. 1998, pp. 42-56 available at http://www.netrino.com/Articles/CompilingJava.10 pages.

Barr, Michael and Brian Frank. "Java: Too Much for Your System?", Embedded Systems Programming, May 1997, pp. 24-32 available at http://www.netrino.com/Articles/EmbeddedJava/index.html 7 pages.

"Debugging JITted Java Code", Research Disclosures, Apr. 1999, 4 pages.

"Overview of the IBM JAVA Just-in-Time Compiler", T. Suganuma et al, IBM Systems Journal, vol. 39, No. 1, 2000, pp. 175-193.*

"The JAVA HotSpot Virtual Machine", Sun, Apr. 30, 2001, 16 pages.*

Thomas, Inn "The Taos (Dow-os) Operating System," Oct. 21, 1994 from newsgroup comp.parallel.

Dick Pountain, "Parallel Course: The Taos operating system uses objects from the ground up to enable processors based on different architectures to work together on the same problem", BYTE!, Jul. 1994.

"Tao Bring Its Super Skinny Operating System Elate to Market", Computergram International, Jan. 19, 1998.

"Tao Shrinks Java for Embedded Systems with Elate Java Engine", Computergram International, Feb. 6, 1998.

Peter Clark, "Tao's object-oriented operating system seeks to enhance Java for embedded apps", EETimes, Feb. 10, 1998.

Peter Clark, "Tao Launches Object-Oriented Operating System", EETimes, Feb. 11, 1998.

"JBed Whitepaper: Component Software and Real-Time Computing", Oberon Microsystems, Sep. 22, 1998 (unverified date), pp. 1-9.

Fox et al., "Towards Web/Java-Based High Performance Distributed Computing - an Evolving Virtual Machine", Proceedings of the High Performance Distributed Computing, 1996, pp. 308-317.

Hsieh et al., "Java Bytecode to Native Code Translation: The Caffeine Prototype and Preliminary Results", Proceeding of the 29th Annual IEEE/ACM International Symposium on Microarchitecture, 1996, pp. 90-97.

Portos/J**ce, Oberon Microsystems, Inc., No Date, 2 pages.

Bacon et al., "Thin Locks: Featherweight Synchronization for Java", Proceedings of the ACM Conference on Programming Language Design and Implementation, Montreal, Canada, SIGPLAN Notices, vol. 33, No. 6, Jun. 1998, pp. 1-11.

Stamos et al., "Remote Evaluation", ACM Transactions on Programming Language and Systems, vol. 12, No. 4, Oct. 1990, pp. 537-565.

Vallèe-Rai et al., "Soot - a Java Bytecode Optimization Framework", pp. 1-11. No Date.

Dickman et al., "Small Virtual Machines: A Survey", pp. 191-202. No Date.

Thorn, "Programming Languages for Mobile Code", ACM Computing Surveys, vol. 29, No. 3, Sep. 1997, pp. 213-239.

Proebsting et al., "Toba: Java for Applications A Way Ahead of Time (WAT) Compiler", Proceedings for the third USENIX Conference on Object-Oriented Technologies and Systems, Portland, OR, Jun. 1997, pp. 1-13 (with cover).

Carzaniga et al., "Designing Distributed Applications with Mobile Code Paradigms", 11 pages, No Date.

PORTOS/J‡‡CE, Oberon Microsystems, Inc. (no date).

* cited by examiner

LOADING OBJECT-ORIENTED COMPUTER PROGRAMS

This is a continuation of International Application PCT/GB99/04415 with an international filing date of Dec. 23, 1999, published in English under PCT article 21(2).

The invention relates generally to methods of and computer systems for loading object-oriented computer programs. More specifically, although not exclusively the invention is concerned with object-oriented programs in which the code is provided in the form of class files, each containing a plurality of methods.

A well known example of an object-oriented programming language is "Java" (a trade mark of Sun Microsystems Inc.). A "Java implementation" is a software system which allows a software application consisting of one or more class files to be run. These class files must conform to some version of the standard Java Virtual Machine Specification, as published by Sun Microsystems Inc. A class file defines the data and program code required for a particular class.

Although there is some interaction, the Java implementation can conceptually be divided into two parts:

The Java Virtual Machine (JVM). This reads the class files and executes the instructions contained within them in a way which conforms to some version of Sun's Java Virtual Machine Specification. Some of the instructions contained within a class may reference the data or program code of other classes; the JVM also manages such relationships between classes.

The Java Class Library. This is a set of predefined classes with data and program code which act in a way conforming to Sun's Java Class Library Specification. These library classes could be implemented in some way other than as real class files, for example using the C or assembler programming languages, in which case the JVM must ensure that references to their data and program code work in the same way as references to classes which originated from real class files.

The program code in a class file is in an instruction format known as Java bytecode (JBC), or simply as bytecode. Each method in the class has its own sequence of bytecode. The bytecode for a method consists of a sequence of JBC instructions.

There are two schemes which JVMs use to execute the bytecode:

An interpreter. In this scheme, the JVM contains an interpreter, which is a piece of program code which executes the bytecode by looking at each JBC instruction in turn, decoding it, and performing the actions demanded by it. While this approach is the simplest to implement, its disadvantage is that it is slower than the alternative, since many steps of the interpreter program are required to interpret a single JBC instruction.

A compiler. In this scheme, the JWM converts the JBC instructions of the bytecode into machine code instructions understood by the CPU being run on (native machine code), before any execution starts. Then, to execute the program code for a method, the compiled machine code is executed instead. There is a time overhead for the initial compilation from JBC instructions to machine code instructions, although this may be done during the preparation of the application rather than when the application is started. Once the compilation has been performed, the method's program code runs much faster, at a speed comparable with other traditionally compiled languages such as C. A special case of the compiler scheme is a just-in-time compiler (JIT), in which the bytecode for a class is compiled just before it is first used.

Some JVMs use a combination of the two schemes, where only program code which is being executed many times is compiled, and the rest is interpreted.

Linking is the process by which a reference from one class C1 to another class C2 (or data or a method in C2) is resolved. If C2 is not already loaded, it is loaded, and compiled if using the compiler scheme, and itself linked. Then the reference in C1 to C2 (or some item of data or a method in C2) is modified such that there is now a direct pointer to whatever in C2 is being referred to.

Sun's Java Virtual Machine Specification allows for a range of linking schemes:

Static linking: The loading and linking of all classes of the application is performed when the application is prepared. This scheme is typically used when an application is embedded permanently in a device.

Dynamic load time linking: Class C2 is loaded the first time another class is loaded which refers to C2 (or some data item or method within C2).

Dynamic late binding: Class C2 is loaded the first time a JBC instruction (or its compiled equivalent) which refers to C2 (or some data item or method within C2) is executed.

In operation, when a particular method of a particular class is invoked, the particular class required may or may not already be resident in the JVM. If the required class is not resident, then the class file for that class must first be loaded from outside the JVM (for example from a disk or from a network), linked and initialised into the JVM. Then, the required method can be found by looking down the list of methods for the class. Once the required method has been found, the Java bytecode of that method is executed until a return is encountered, whereupon the method has ended and control is returned to the invoker of the method. A method invocation can also be terminated by an exception being thrown which is not caught in the method.

FIG. 1 illustrates a typical prior art implementation in which the JVM makes use of a JIT compiler. The JIT compiler 120 takes the class bytecode 110, just before it is to be used, and translates it into native code 130 ready for execution on a specific processor. The remains of the class 140 (or possibly the entirety of the class) remains available in the memory in case the native code 130 should need to refer to it while running. Typically, the remains of the class that may need to be referred to include such things as the table of data fields and the constant pool. Where static linking is used, the loading and possibly some or all of the compilation occurs when the application is being prepared. Once again, the original class file (or parts of it) have to remain in memory so that the native code can refer to the table of data fields and the constant pool.

FIG. 3 illustrates a typical prior art JVM implementation in a multiprocessor environment. A server 210 maintains a class store 220 for holding the bytecode of the various classes that may be required by the client processors 230, 240. Within the class store 220 is shown a typical Java class 211 containing within it a plurality of individual methods 212.

The server 210 supplies the class files 211, as necessary, across a communications network generally indicated at 250 to the clients 230,240. In this example, the processors 230,240 are of two different types—namely client type 1 and client type 2 respectively. Each of the clients maintains its own JIT, respectively 231,241, enabling it to compile the received class file 211 to its own version of native code 233,243, and to store that in its own native code store 232,242. In addition, and as previously described with reference to FIG. 1, the remains of the class file 211 (or possibly the entire class file) will remain in local memory, as generally indicated at 234,244, in case the native code 233,243 should need to refer to it while running on the local processor.

In an alternative prior art arrangement (not shown) the client JITs 231,241 may be maintained on the server 210, with the conversion to native code being done there rather than at the clients 230,240.

There are several disadvantages with either prior art arrangement. Firstly, in each case, a large execution environment is required on each of the clients. In addition, either the Java class file 211 or the native versions 233,243 along with the class file remains 234,244 need to be transmitted across the communications network 250, and remain in client memory. Either approach is unsatisfactory in practice, particularly in the context of wireless client networks such as mobile cellular phone networks, since the class files are typically large.

According to a first aspect of the present invention there is provided a method of loading an object-oriented computer program comprising program code provided in the form of classes each containing a plurality of methods, the methods comprising compiling a method of the class into compiled code and holding that code, ready for execution, in an execution environment which does not necessarily also hold program code of the said class. Typically, although not necessarily, each class will be defined by an individual class file, in which case the invention provides that the execution environment does not necessarily also need to hold the original class file.

The program code representing the original class and/or class file is in the present invention not required to allow the compiled code to run in the execution environment.

In the preferred embodiment, compilation proceeds by a two step process. In the first step, the program code (for the example the bytecode of the class) is translated into virtual processor code which uses the instruction set of a virtual processor. In the second step, the virtual processor code is translated into native code, which uses the instruction set of a real, physical processor.

The invention in its various aspects improves memory utilisation by dispensing with the need for the original class file to be held in memory, in case it should be needed by the executing application. By using the two stage translation process described above, application programmers can design programs in a high level language (such as Java), without having to worry about the typically large size of the Java class files. The invention in its preferred form allows an application to be written in a high level memory-intensive programming language such as Java, while at the same time allowing the resultant program to be run within an extremely small "footprint". This is particularly useful when the application is to be used in an embedded system, such as for example, a mobile phone, a hand held computer, or a games console.

The invention may be used in conjunction with a number of different linking schemes, for example static linking, dynamic load time linking, and dynamic late binding.

According to a further aspect of the invention there is provided a computer system for loading an object-oriented computer program comprising code provided in the form of classes each containing a plurality of methods, the system defining an execution environment and being operable to compile a method of the class into compiled code and to hold the compiled code, ready for execution, in the execution environment, the execution environment not necessarily also holding program code of the said class.

According to yet a further aspect of the invention there is provided a distributed computer system comprising a server in communication via a transmission means with a plurality of client devices, each having a respective execution environment for executing an object-oriented computer program comprising program code, provided in the form of classes each containing a plurality of methods, the system including:
  (a) means for compiling the program code into compiled code;
  (b) means for selecting for execution on one of the client devices one of the methods of one of the classes; and
  (c) means for transmitting compiled code from the server to the said client device without necessarily transmitting program code of the selected class.

According to yet a further aspect of the invention there is provided a computer system for loading an object-oriented computer program comprising program code provided in the form of classes each containing a plurality of methods into a plurality of client devices, the devices each containing a respective execution environment, the system comprising:
  (a) means for compiling selected methods of selected classes into compiled code; and
  (b) means for loading the compiled code, ready for execution, into the respective execution environments without necessarily loading program code into the execution environments.

The invention, in this aspect, allows application programs to be multiply uploaded into a plurality of individual client devices, for example mobile phones. The compiled code may be uploaded into the phone memories without any need for the original class file or the program code to be uploaded.

According to another aspect of the present invention there is provided a method of loading an object-oriented computer program comprising code provided in the form of classes each containing a plurality of methods, the method including:
  (a) selecting for execution one of the methods of one of the classes; and
  (b) loading the selected method into an execution environment without necessarily loading into the execution environment the whole of the selected class.

The method of the invention provides all of the dynamic features of the Java Virtual Machine (JVM), but with a substantially reduced footprint compared with conventional approaches.

In its preferred form, the invention provides fine granularity of binding/linking, loading, compilation and transmission across a communications network. More specifically, the granularity is at the method/tool level rather than the class level as with conventional object-oriented systems. The invention is particularly although not exclusively applicable to a Java Virtual Machine (JVM) environment. The invention provides for the entire range of JVM linking schemes, namely static linking, dynamic load time linking and dynamic late binding. Specific fields of application for preferred embodiments of the invention include wireless communications (wireless client networks), and specifically although not exclusively mobile cellular phone networks. The invention may also be applied to other embedded devices, preferably networked devices, such as (without limitation) hand-held computers, games consoles, cameras, or indeed any other type of networked or networkable device. In one embodiment the system may consist of or include a wireless network, whereas in other embodiments it may include a private or public fixed network, or the Internet. Where the client devices are not capable of wireless communication, provision may be made for them to be coupled to the Internet as required (for example via a standard modem or ISDN link). In such a way, the invention could be applicable to a wide range of embedded devices, including for example cameras, televisions, washing machines, motor vehicles or indeed virtually any other type of computer operated device that can be conceived of.

One advantage of the invention, when applied to wireless client networks, is that each individual transmission (of a method/tool) is of a significantly shorter duration than with conventional systems in which the entire class file has to be downloaded. This means that the network provider does not need to keep the virtual circuits of the network open for long periods. Each small method/tool to be transmitted can if necessary be routed differently. In addition, the transmission of smaller discrete chunks of data means that lower redundancy and error correction is required. The load on the network can therefore be reduced by a greater amount than would be expected merely by a consideration of the data transfer rates.

In its preferred form, the invention is particularly applicable for use with object-oriented computer programs that are to be compiled (rather than interpreted) prior to execution. When the invention is used in the context of a distributed computer system, the individual methods may be compiled either before or after they are sent across the network to the client device.

Preferably, the invention includes the preliminary step of translating the classes into a plurality of virtual processor tools which use the instruction set of a virtual processor. Then, the step of selecting one of the methods for execution may include selecting one of the virtual processor tools. When used in the context of a networked system, either the virtual processor tools may individually be transmitted across the network to the client device, or alternatively the individual virtual processor tools may first be compiled and the native compiled code transmitted across the network.

The invention further extends to a computer system adapted to carry out a method as previously described.

The invention further extends to a computer system for loading and/or executing an object-oriented computer program comprising code provided in the form of classes each containing a plurality of methods, the system defining an execution environment and being operable to select for execution one of the methods of one of the classes, and to load the selected method into the execution environment without necessarily loading into the execution environment the whole of the selected class.

According to another aspect of the invention there is provided a distributed computer system comprising a server in communication via a transmission means with a plurality of client devices, each having a respective execution environment for executing an object-oriented computer program comprising code provided in the form of classes each containing a plurality of methods, the system including:
 (a) means for selecting for execution on one of the client devices one of the methods of one of the classes; and
 (b) loading the selected method into the execution environment in the said client device without necessarily loading into the said execution environment the whole of the selected class.

The invention extends not only to methods and apparatus for loading object oriented computer programs, but also to methods and apparatus for compiling such programs, binding such programs, executing such programs, and transmitting such programs across a communications network.

Finally, the invention also extends to a computer program for implementing any of the described methods whether or not embodied on a data carrier. It also extends to a data stream representative of a computer program for carrying out the described method.

It is to be understood that; where used in the description and claims, the word "code" includes data where that data is part of the program itself. Accordingly, but without limitation, the expression "code" includes such things as constants, variable names and types, flags, pointers, object names and so on.

The invention may be carried into practice in various ways and one specific embodiment will now be described, by way of example, with reference to the accompanying drawings, in which.

Figure 1:
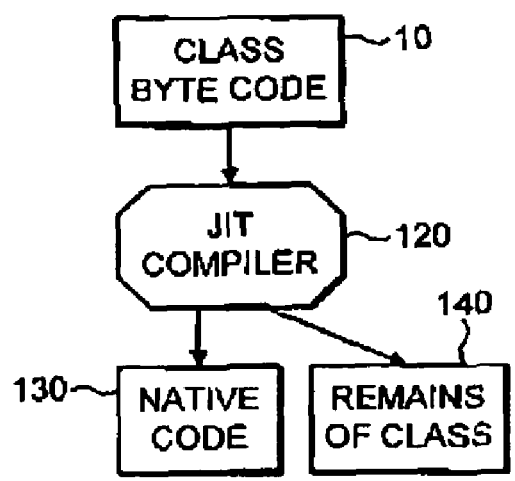
FIG. 1 illustrates the operation of a conventional JIT compiler within a JVM.
Figure 7:
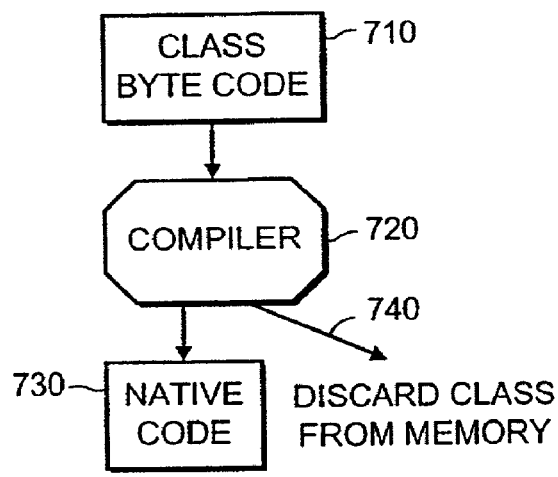
FIG. 7 illustrates schematically the preferred operation of the present invention.

FIG. 1, which has been described above, shows the way in which a JIT compiler within a JVM translates from processor-independent bytecode to processor-dependent native code for running on a particular processor. With such a prior art approach, the remains of the class 140 (or possibly the entirety of the class) has to be retained in memory in case the native code 130 should need to refer to it while running. The preferred embodiment of the present invention, shown schematically in FIG. 7, takes a different approach. Here, the class bytecode 710 is translated by a compiler 720 into native code 730. The compiler converts all of the necessary parts of the original class bytecode file into native, including any data in the constant pool. The native code 730 is complete in itself, and does not need to refer to any parts of the original class when it is run. The compiler 720 is therefore able as shown schematically by the arrow 740 to discard the entire class (that is, the entirety of the original class file) from memory.

The compiler 720 may be arranged to effect static linking, dynamic load time linking or dynamic late binding. It may convert the class directly into native code or, alternatively, as described below it may carry out the conversion in two stages.

In the present invention, conversion from bytecode to native code preferably takes place in two separate stages:
1. Conversion of the class file to an intermediate processor-independent form. This will be referred to as Virtual Processor or VP code. The converter itself is known in the preferred implementation as the "jcode translator".
2. Conversion from the intermediate VP form to the native machine code. The converter here will be known as the "native translator".

Figure 2:
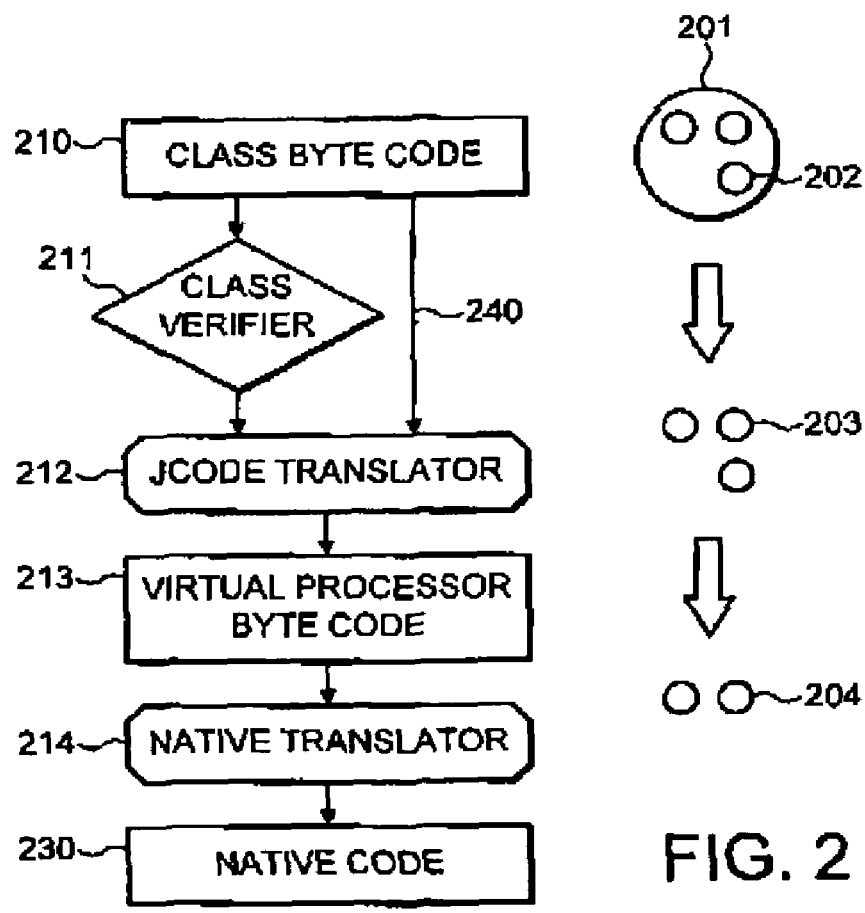
FIG. 2 illustrates the two-stage translation process of the preferred embodiment of the present invention.

FIG. 2 illustrates in more detail the translation from class bytecode to native code. The class byte code 210 is first checked for validity by a class verifier 211. This checks not only the individual bytes themselves, but also checks for valid external and internal references. The class verifier if necessary loads additional classes to check the external references.

Once the code has been checked, it is passed to the jcode translator 212 which converts it, as described in more detail below, into VP code 213. The VP code 213 is then converted by the native translator 214 to the native code 230.

It is important to appreciate that the class verifier 211, the jcode translator 212 and the VP code 213 are all processor-independent. It is only the native translator 214 and of course the final native code 230 which is processor-specific.

Shown on the right hand side of FIG. 2 is a schematic representation of the objects that are being manipulated during the translation process. The process starts with the class bytecode in the form of a Java class file 201 which consists of a plurality of individual methods 202. The jcode translator translates the class file into a plurality of individual virtual processor tools 203. Depending upon the application to be run, a selection is made of those virtual processor tools 203 which will be required, and those selected tools (and only those tools) are then translated by the native translator into individual native methods 204. It is important to appreciate that the entirety of the original class file 201 is not necessarily being passed through the native translator 214: only those virtual processor tools 203 which are actually needed by the application will be translated and ultimately stored for running on the client. Once the translation process is complete, not only the entirety of the class file 201, but also the VP tools 203 are discarded from memory. Only the individual native methods 204 remain, allowing extremely efficient memory utilisation.

Figure 3:
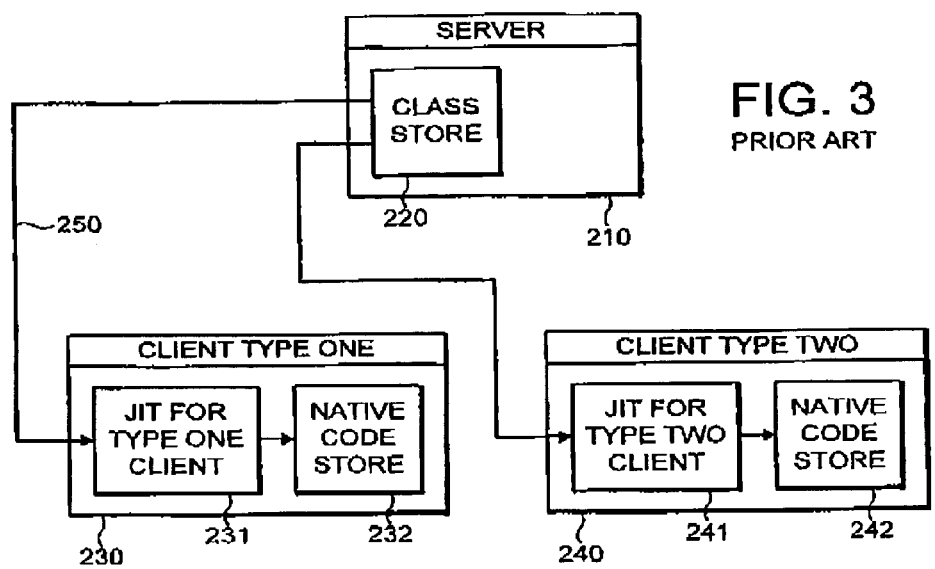
FIG. 3 shows a typical prior art client/server system.
Figure 4:
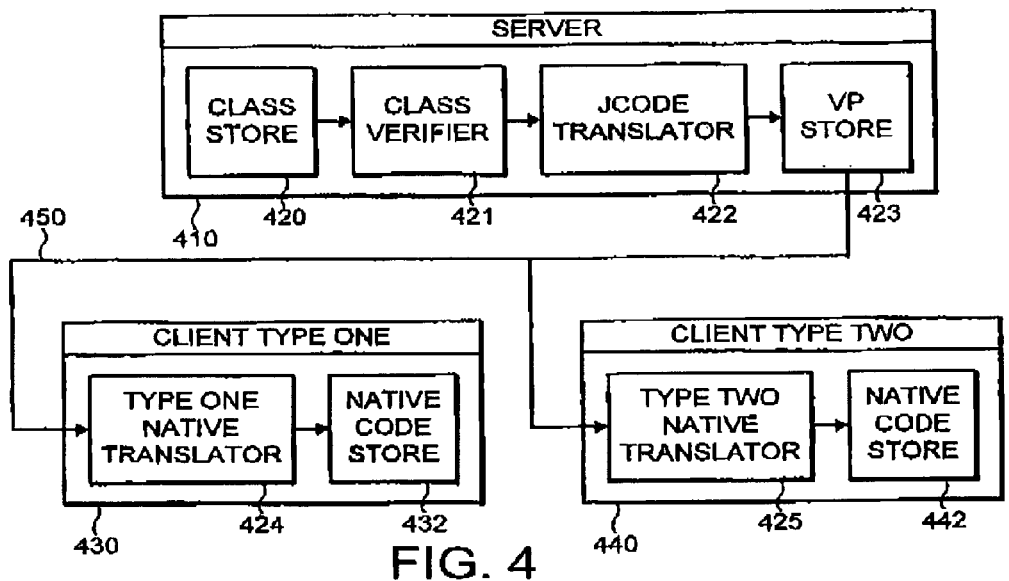
FIG. 4 illustrates the operation of the preferred embodiment of the invention within a client/server system.
Figure 4A:
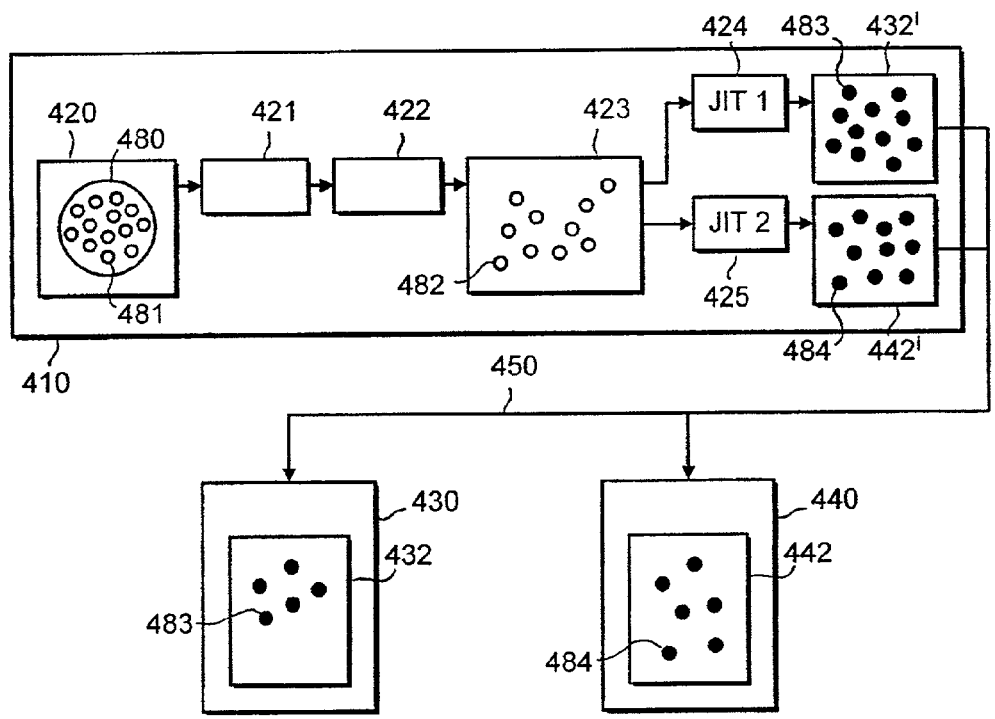
FIG. 4a illustrates a variation of the embodiment shown in FIG. 4.

The use of the preferred embodiment within a heterogeneous multiprocessor environment is shown schematically in FIG. 4 and 4a. This should be compared with the corresponding prior art approach shown in FIG. 3.

In FIG. 4, the server 410 is serving two clients 430,440 (having different processors) via a communications network 450. All of the processor-independent calculation is carried out on the server; in particular, the server maintains a class store 420, a class verifier 421, a jcode translator 422 and a VP store 423. An initial Java class file 480, consisting of a plurality of methods 481, is translated via the two-stage process described previously, into a plurality of VP tools 482 which are stored within the VP store 423. The VP (processor-independent) tools can then be served individually, as required, across the network 450 to the individual clients. The VP tools are then translated by the individual client translators 424,425 into native methods 483,484 which are optimised for their respective processors. These native methods are stored within the respective native code stored 432,442.

The use of VP on the server, as shown in FIG. 4, allows the verification of the class files and the first stage of the compilation (the conversion to VP code) to be performed once only by the server. Then, only the native translation (which differs according to the processor type) needs to be performed by the client device before execution. Such an arrangement makes it easy to supply updated classes at the server, without the server needing to know anything about the details of the particular clients that will wish to make use of those classes. An updated class needs to be amended once only, in the class bytecode, and then translated once only into VP. The VP is transmitted to the client devices, as necessary, and the final translation to native code can be carried out at the client in a way which is entirely transparent to the end user. In addition, no amendment to the server or to the VP code is required in the event that a new type of client comes onto the market which requires different native code. The client manufacturer simply provides the client with an appropriate native translator, and the device should operate without any manual intervention at the server.

With the approach described, it is not necessary to download across the network the Java class file 480, nor all of its individual methods 481. Only those VP tools which are actually required by the individual client applications need be transmitted across the network. The required VP tools may be either downloaded on demand (for example by means of a control signal transmitted from the client back to the server), or alternatively may be transmitted when the server determines that it is necessary. In one embodiment, for example, the server may transmit updated VP tools across the network in order to update an applications program which is running on the client. That could be done in real time, in a way which is entirely transparent to the end user. Alternatively or in addition the individual transmitted VP tools may represent "add-ins", or additional functionality that the user wishes to add to an application program to be run on the client. In one particularly convenient approach, when the user attempts to make use of functionality in an application program for which code is not available at the client, the client automatically transmits a signal to the server requesting that the necessary VP tools be downloaded. The server responds by transmitting the requested VP tools which are then translated into native form by the local native translator 424,425.

Once the class file 480 has been converted to appropriate VP tools 482, the class file may be discarded from the server memory. Likewise, on each of the clients, once the downloaded VP tools have been converted into native methods 483,484, the VP tools may be discarded from client memory.

FIG. 4a shows an alternative embodiment in which the individual native translators are maintained on the server. In FIG. 4a, the reference numerals have the same meaning as those used in FIG. 4.

In one version of this embodiment, a full collection of native methods for each of the client processors is stored on the server within respective native code stores 432',442'. Since it cannot necessarily be determined in advance which methods will be needed by the individual clients, it is preferred that the entirety of the VP tools 482 be passed through the respective native translators 424,425 to provide a comprehensive selection of native methods 483,484. When a particular new or updated method is called for by the client, or is required to be sent by the server, the appropriate individual native method is sent across the communications network 450. As before, only individual methods are sent, not the entire class, nor all of the native methods which have been created from the original class.

In this embodiment, both the entirety of the class file 480 and the individual VP tools 482 may be discarded from server memory once the native methods 483, 484 have been constructed. It should be noted that no part of the class file, nor any VP tools, are downloaded across the network. Likewise, no part of the class file nor any VP tools are present in client memory. This ensures particularly efficient client memory utilisation.

In yet a further alternative method, the server need not maintain a complete collection of pre-translated methods for each possible client processor. Instead, when a particular VP tool is needed, it is translated on the fly by the appropriate native translator 424,425 and the native method transmitted immediately to the client.

Figure 5:
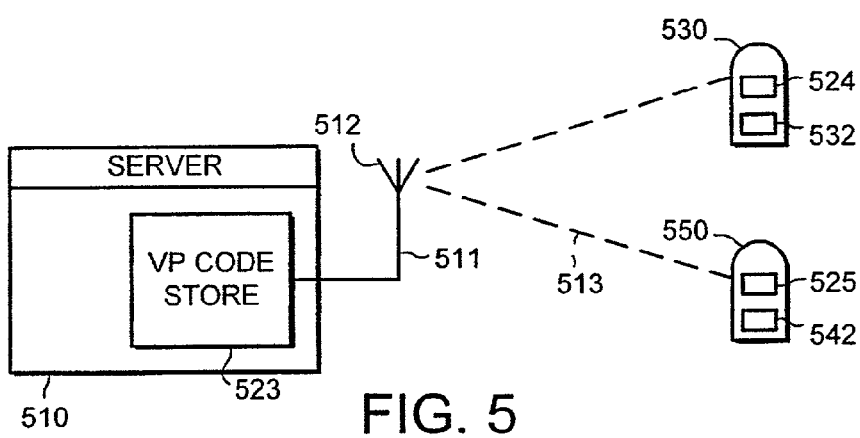
FIG. 5 illustrates the operation of the present invention within a wireless network.

Once specific implementation, illustrated in FIG. 5, is that of a mobile phone network. Individual mobile phones 530, 550 using the network each include a respective native translator 524,525 and a native code store 532,542. When it is required to upgrade the functionality of the phones, updated VP code is supplied from a VP store 523 on a central server 520. The updated VP code is sent via a land-based communications network 511 to a wireless transmitter 512. The code is then packetized and sent across a wireless link 513 to the individual phones. On receipt, the VP code is automatically translated into native and stored in the native code store. The whole process may be transparent to the phone user; or alternatively the updated code may be sent on receipt of a specific request from the phone user, via the wireless link 513.

Implementing a mobile telephone network (or indeed any other type of wireless client network) in this way allows the clients to download individual methods (each of which might be for example 100 bytes in length) instead of having to download an entire class (which might be for example 1 megabyte). Transmitting individual methods in this way also has advantages for the wireless network provider since virtual circuits do not need to be maintained open for lengthy periods while large files are being transmitted. Each small individual method can be routed differently. Also, the transmission of smaller chunks of data reduces the need for redundancy and error correction techniques, thereby increasing the capacity of the network over and above that which would be expected merely by a comparison of raw data transfer rates. The fact that no part of the original class file, nor the VP tools, need to remain in client memory means that the entirety of that memory can be dedicated to the storage of native methods, and to the running of applications in native.

For completeness, a detailed description will now be given of the preferred method by which the class file is converted into VP and the VP tools are converted into native. It will be understood that this is purely exemplary, and that the present invention is not limited to an embodiment in which there is a two-stage translation, first from bytecode into VP and then from VP into native.

Turning back now to FIG. 2, further details will be given of the preferred two-stage translation from class bytecode 210 into native code 230. As previously described, the class verifier 211 checks the class bytecode for validity. The class verifier may in some embodiments be incorporated within the jcode translator, in which case the class bytecode 210 is passed straight to the jcode translator 212 as shown by the arrow 240.

The JVM and the bytecode instructions it implements are stack based, which means that operands (numbers, pointers to objects) are kept on a stack, on which the last item to be pushed on is the first to be popped off. A bytecode instruction typically removes one or more operands from the stack, performs some action, and pushes the result operand (if any) back on the stack. On the other hand, VP is register based, in that it has a set of registers which are addressed directly by the VP instructions. An instruction typically takes its operand(s) from register(s) specified in the instruction, performs some action, and puts the result operand (if any) into a further register specified in the instruction. This register based architecture is more similar to most real processors, except that VP has a very large number of registers, large enough such that any system converting to VP does not need to worry about how many there are.

VP instructions are based around expressions. A single instruction typically has one or two operands, and each operand can be a constant, a register, or an expression. An expression then has one or two operands, each of which can be a constant, a register or an expression. In this way, an arbitrarily complex instruction can be built up.

There now follows a more detailed description of how parts of a class file are converted. The description uses the term "fixup"; this is a small item of data attached to a particular point in the compiler's output code or data which instructs the JVM that the code or data at that point needs to be modified in some way before it can be used. Fixups are used to change a native instruction or a data item such that the native code can obtain a direct reference to another class, or to a field or method therein.

A java class file consists of the following parts:
A constant pool, which contains the constant numbers and names in other parts of the class file, instead of a name, there is a reference to a name which is stored here.
Information such as the name of this class, the superclass and any direct superinterfaces.
A list of fields, with information on each one.
A list of methods, with information on each one. This information includes its code section. Thus there are several code sections, one for each method.

The Java class file is converted to VP tools as follows:
A data tool. Despite its name, this has nothing to do with the data to be used by the class. Instead it contains information about a class, including but not limited to the names, parameters and types of all constructors, fields, methods and other entities which make up the API of a class. A typical use for this would be for reflection (i.e. the functionality in java.lang.reflect in a Java Library). Reflection is a programmatic interface to allow a programmer to enumerate and manipulate the constructors, fields, methods and other entities which belong to a class. The data tool is also used by the verifying jcode translators, in situations where either the Class file is not available, or where the class file has already been translated. Where the class is written in VP, there is no class file anyway.
A class tool. This contains some housekeeping information used by the JVM (including the size of object to allocate, and the size of the class's static data if any, and the superclass and superinterfaces), and code for some or all of the non-static methods.
Zero or more method tools. Methods which do not appear in the class have their own individual tools. The decision on whether to place a method in its own tool can be based on a number of factors such as the size of the method.
A fixup tool. The fixup tool typically returns a constant fixup value which is used to determine the offset within an object of a particular field. The tool is called at fixup time to provide the offset, and the binder/linker patches this offset into the code that wants to use it. It is thus used to implement both "get a field" and "put a field" in the bytecode. More generally, the fixup tool returns data used for fixups. This can only be determined at fixup time and not at compile time. The data may include, but is not limited to, the size of a class instance and the offset within a class instance of a field. The data tool can be discarded if the java application is known not to use certain facilities (largely reflect), and the fixup tool can be discarded if the java application is to be embedded in a device which does not dynamically load further java classes.

The jcode translator uses a VP register for each item on the stack.

VP code does not directly implement the class file's mechanisms for accessing another class, method or field from within the bytecode. In the bytecode there are instructions for, but not limited to, calling a method (in this or another class), getting the contents of a field (in this or another class), pushing a value onto the stack, popping a value off the stack and setting the contents of a field. The jcode translator converts these into VP instructions which may do one of the following (this is not an exhaustive list):

- Call a non-static method (i.e. one to which an object pointer must be passed) in a class. VP has the concept of a class with methods, which is used to implement Java classes. Such methods can be called virtually (the actual method called depends on the class of the object whose pointer is passed) or non-virtually (the method called is in the class specified in the call).
- Call a subroutine. This is used to implement the bytecode's call of a static method (i.e. one to which no object pointer need be passed), and in some cases a non-static method.
- Get the value of the constant fixup from the fixup tool.

The constant pool within a class file is converted as follows:

- A constant pool entry containing a constant number (integer or floating point) is incorporated into the compiled version of the JBC instruction which references the constant number.
- A constant pool entry containing string data which is used directly by a JBC instruction is copied into the data attached to the compiler's output code.
- Other constant pool entries containing string data are not used directly, but are used when referred to by the constant pool types below, or by other parts of the class file.
- A constant pool entry referencing a class C causes a fixup referencing the class C (or the JVM's internal name for the class) to be attached to the compiler's output code/data such that a JBC instruction using this constant pool entry to refer to C is compiled to a native code sequence which, after applying the fixup, obtains access to class C's code and data.
- A constant pool entry referencing a field F in a class C causes a fixup referencing F in C (or the JVM's internal name for F in C) to be attached to the compiler's output code/data such that a JBC instruction using this constant pool entry to refer to F is compiled to a native code sequence which, after applying the fixup, obtains access to field F.
- A constant pool entry referencing a method M in a class C causes a fixup referencing M in C (or the JVM's internal name for M in C) to be attached to the compiler's output code/data such that a JBC instruction using this constant pool entry to refer to M is compiled to a native code sequence which, after applying the fixup, obtains access to method M.
- A constant pool entry giving a name and type of a field or method is not used directly, but is used when referred to by other constant pool entry types or other parts of the class file.

Figure 6:
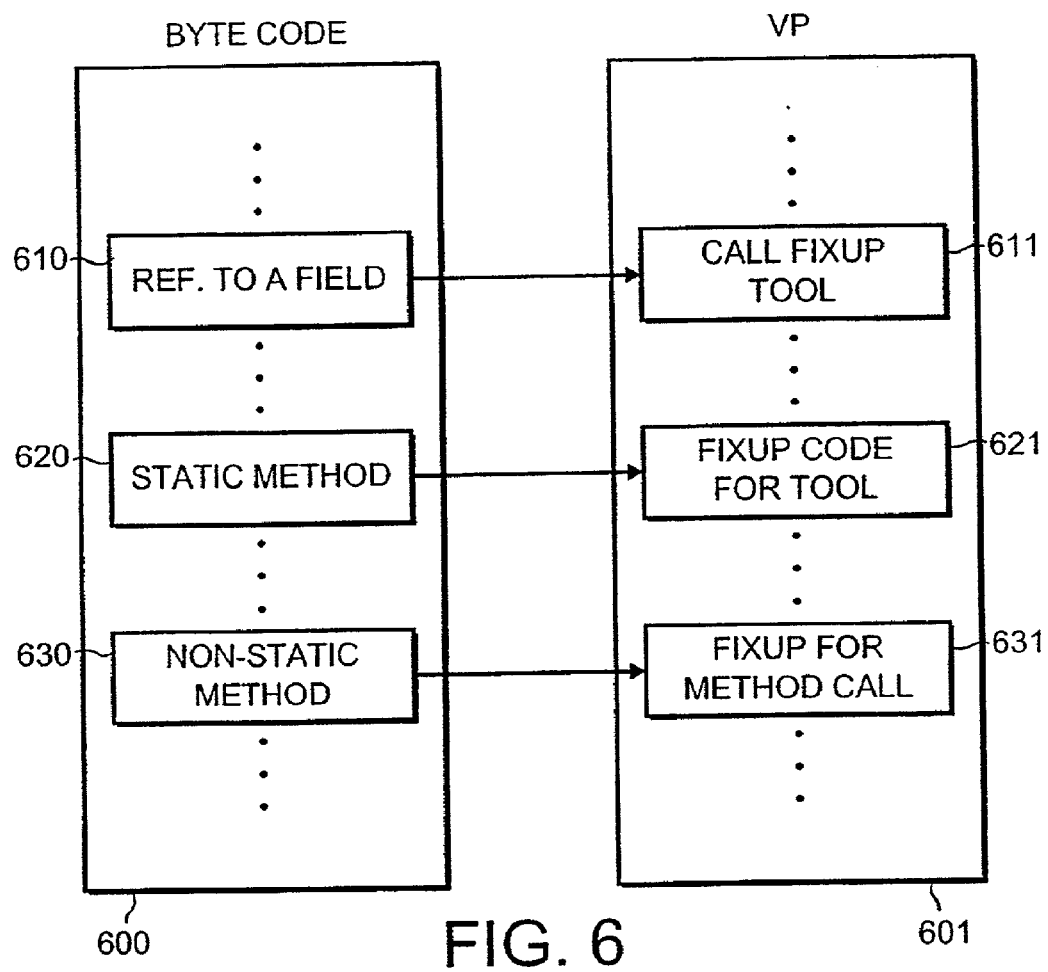
FIG. 6 illustrates certain aspects of the translation from bytecode to intermediate virtual processor code according to the preferred embodiment of the invention.

The code section within a class file is converted as follows:

Code doing purely numerical calculations (ie where there is no reference to an external method) is translated straight from bytecode into a corresponding tool in VP. As shown in FIG. 6, where the bytecode 600 has a reference 610 to a field, that is converted at fixup time by a call 611 to the fixup tool. The call to the fixup tool returns a value which references the location of the field. Thus, by the time the instruction is run it has been patched to contain the correct offset.

A static method 620 is converted to a corresponding VP tool, but with added fixup code 621.

A non-static method 630 has added to it a fixup for a method call (ie a reference to the method name). This will eventually become an atom in the final native code.

The calling conventions are rather different in bytecode and VP. In conventional byte code such as Java byte code, the parameters to be passed to a subroutine are placed on the stack, followed by a reference to the method to be called. A byte code instructions to call a method is then executed which takes the method reference from the stack, resolves it and starts executing the new method with the parameters from the stack. Control is returned to original method when a return instruction is executed. This is converted to VP which loads all the parameters into VP registers before executing a gos (goto subroutine) instruction which has been fixedup to point to the destination method (this fixup may be statically or dynamically found). Execution is passed to the subroutine and returns when a 'ret' instruction is executed.

Other parts of the file are converted as follows:

- The name of the class determines the name used by the JVM to refer to the code and data output by the compiler.
- The name of the superclass becomes some reference to the superclass within the code and data output by the compiler. In the preferred implementation, the output data contains a pointer with a fixup attached such that, after linking, the pointer points to the superclass code and data.
- The name of each interface becomes some reference to the interface within the output code and data. In the preferred implementation, the output data contains a pointer for each interface with a fixup attached such that, after linking, the pointer points to the interface code and data.
- The debug information attached to each method (and the source filename which is stored in the class file), when present, is converted to a format suitable for the environment in which the JVM is running. In the preferred implementation, the debug information is converted to the same format used for non-Java parts of the system.

The final VP class comprises one or more named tools, normally including at least the data tool, the class tool, the fixup tool and zero or more method tools. The tool names are generated automatically by the jcode translator, each name being related to the name of the class and the function of each tool within the implementation of that class.

Turning back again to FIG. 2, further details will now be given of the native translator which translates the VP code into native code. It will be understood, of course, that VP code is never itself run directly in a live application; it is always converted by the processor-dependent native translator into the appropriate native code for the processor on which it is to be executed.

The native translator 214 is quite a small piece of code (around 150 k, depending upon the processor), so that it can easily be stored in memory within an embedded system. The translator 214 maps VP registers to the registers of the particular processor being used. The translator uses its knowledge of the real processor's register architecture to decide at each point in the output native code which VP registers should be mapped to the real processor's registers, and which should be kept in memory (which is slower to access). The translator also provides machine-dependent optimisation of instructions. Until the native code is bound in, it will still normally contain sections of fixup code. On binding (or sometimes at run-time) the fixup code will be replaced with appropriate machine-dependent instructions. For example, the fixup for a non-static method will be converted to an atom in the native code.

Both the jcode translator and the native translator are themselves preferably written in VP code and can thus be translated (using the native translator itself) to run on any desired platform. From that initial VP code, compiled versions of both translators may be provided in native code, optimized for the particular processor on which the translator is to execute. To compile the VP code for the jcode translator, that code is passed through the native translator. To compile the VP code for the native translator, that code is passed through the native translator itself.

Although the preferred embodiment uses the Java Virtual Machine, the overall inventive concept is more general, and it is not essential to use the JVM, or indeed Java at all. Where Java is used, however, the invention described allows Java-skilled applicators programmers to develop programs in their preferred language, without having to understand, or even to know anything about, VP code.

What is claimed is:

1. A method of loading onto a client device an object-oriented computer program, the method comprising
    receiving from a communications network to which the client device is attached a class file comprising a plurality of methods,
    compiling a method of the class file at the client device and prior to execution into native code and, subsequently, holding that code, ready for execution, in a computer memory of an execution enviroment without requiring the holding of the program code of the class file in the execution environment.

2. A method as claimed in claim 1 in which the program code is not loaded into the execution environment.

3. A method as claimed in claim 1 in which the program code is loaded into the execution environment, and then is discarded.

4. A method as claimed in claim 1 including compiling a plurality of methods of the class and statically linking them.

5. A method as claimed in claim 1 including coupling a plurality of methods of the class file and dynamically linking them on loading of the native code into the execution environment.

6. A method as claimed in claim 1 including compiling a plurality of methods of the class file and dynamically binding them on execution of the native code in the execution environment.

7. A method as claimed in claim 1 in which the class file is a Java class file.

8. A method of executing a computer program comprising loading the program as claimed in claim 1, and executing the program in the execution environment.

9. A computer program adapted to carry out a method as claimed in claim 1.

10. A computer-readable medium encoded with a computer program adapted to carry out a method as claimed in claim 1.

11. A client device for loading an object-oriented computer program, the client device defining an execution environment and comprising
    a processor; and
    a memory in communication with the processor, the memory for storing a plurality of processing instructions enabling the processor to be operable to receive from an attached communications network a class file comprising a plurality of methods, and further be operable to compile a method of the class file into native code prior to execution and, subsequent to compilation, to hold the native code, ready for execution in a computer memory of the execution environment without requiring the holding of the program code of the class file in the execution environment.

12. A client device as claimed in claim 11 comprising a mobile phone.

13. A cheat device as claimed in claim 11 comprising a games console.

14. A client device as claimed in claim 11 comprising a hand-held computer.

15. A computer system comprising:
    a plurality of client devices as claimed in claim 11, and
    a server in communication via a communications network with the plurality of the client devices, each client device having a respective execution environment.

16. A client-device for loading an object-oriented computer program, the client device comprising:
    means for receiving from a communications network a class file comprising a plurality of methods;
    means for compiling a method of the class into native code prior to execution; and
    means for loading, subsequent to compilation, the native code, ready for execution, into a computer memory of an execution environment able to execute the native code without requiring the loading of the program code of the class file into the memory.

* * * * *